United States Patent [19]

Honig

[11] 3,871,114
[45] Mar. 18, 1975

[54] DEVICE FOR TEACHING THE ADDITION OF FRACTIONS

[76] Inventor: Joseph Honig, 3 Warthburg Place, Valhalla, N.Y. 10595

[22] Filed: May 17, 1974

[21] Appl. No.: 470,773

[52] U.S. Cl. ............................................... 35/31 D
[51] Int. Cl. .............................................. G09b 19/02
[58] Field of Search ...... 35/36 R, 36 A, 36 B, 36 C, 35/36 D, 36 E, 36 F, 36 G, 30, 32

[56] References Cited
UNITED STATES PATENTS

| | | | |
|---|---|---|---|
| 1,649,578 | 11/1927 | Deming | 35/31 D UX |
| 2,930,146 | 3/1960 | Cassel | 35/31 R |
| 2,950,542 | 8/1960 | Steelman | 35/31 G |
| 3,144,252 | 8/1964 | Saunders | 35/31 B UX |
| 3,526,973 | 9/1970 | Delves | 35/31 E |

*Primary Examiner*—Wm. H. Grieb
*Attorney, Agent, or Firm*—Allison C. Collard

[57] ABSTRACT

A device for teaching addition and subtraction, respectively comprising a board having a longitudinal insert recess, a plurality of bars having the same width and a plurality of blocks, the blocks having a width exactly equal to integral numbers multiplied by the width of the bars. the bars and blocks are insertable in the insert recess and are complementary at least in part thereto such that the widths of the bars and blocks are aligned in the longitudinal direction of the insert recess. A slide rule is displaceably mounted on the board longitudinally with respect to the insert recess, and the board has a scale of fractional numbers corresponding to a division of the insert recess in the longitudinal direction thereof in units of the width of the bars. The slide rule is formed with an indicator cooperating with one of the fractional numbers for indicating thereby the answer to the solution of an addition or subtraction problem, corresponding to the blocks and bars positioned in the recess.

10 Claims, 7 Drawing Figures

DEVICE FOR TEACHING THE ADDITION OF FRACTIONS

The present invention relates to a device for teaching and learning arithmetic, in general, and to a device for teaching and learning addition and subtraction, utilizing bars and blocks and a slide rule, in particular.

Several devices are already known for teaching arithmetic which have gears and wheels and registers. Other calculating instruments are formed exclusively of slidable members having numbers which are visible through an aperture, and there are also known devices constituting picture or number cards.

It is an object of the present invention to provide an improved addition and subtraction device, which is simple in construction and low in cost, as well as being exceptionally suited to the visualization and learning of the operations of addition and subtraction.

It is another object of the present invention to provide a device for learning addition and subtraction comprising a visual display of the problem to be solved, as well as blocks cooperating with a work table insert for actually carrying out the solution of the problem by the addition or removal (also superpositioning) of the blocks, and a slide rule for cooperating with the added or removed blocks indicating the solution to the problem.

It is still another object of the present invention to provide a device for teaching addition and subtraction, respectively, comprising a board having a longitudinal insert recess; a plurality of bars having the same width, and a plurality of blocks, the blocks having a width exactly equal to integral numbers multiplied by the width of the bars; the bars and blocks being insertable in the insert recess and complementary at least in part thereto, such that the widths of the bars and blocks are aligned in the longitudinal direction of the insert recess; a slide rule displaceably mounted on the board longitudinally with respect to the recess, the board having at least one numerical fractional scale of fractional numbers corresponding to a division of the insert recess in the longitudinal direction of the insert recess in units of the width of the bars; and the slide rule being formed with an indicator cooperating with one of the fractional numbers for indicating thereby the answer to the solution of an adding or subtraction problem corresponding to the blocks and bars positioned in the recess.

It is a further object of the present invention to provide the device in accordance with the above-mentioned objectives, further comprising a problem card pad disposed on the board and containing a plurality of problems to be solved.

Further the board is formed with a guide slot longitudinally aligned relative to the insert recess, and the slide rule is complementarily slidably disposed in the slot. The rule is formed with at least one window, which constitutes the indicator means. The fractional numbers are disposed on the guide slot and the window is aligned with respect to the fractional numbers and of a size to show therethrough only one of the numbers at a time.

It is still a further object of the present invention to provide the device in accordance with the above objectives, wherein the guide slot is dove-tail in cross section and the slide rule is trapezoidal in cross section. The slide rule further may be provided with a handle for sliding the rule.

It is also a further object of the present invention to provide a device, in accordance with the above objectives wherein the board includes scale marks aligned longitudinally along the insert recess, uniformly dividing the recess in widths equal to that of the bars, the scale marks pointing to corresponding fractional numbers of the numerical fractional scale.

It is still another object of the present invention to provide a device, in accordance with the above-mentioned objectives, wherein the blocks are scored in fractional widths equal to the width of the bars, and the blocks and bars are formed with depressed portions on an upper surface thereof, and the blocks and bars are formed on their lower surface so as to complementarily engage in the depressed blocks and bars.

Other objects and features of the present invention will become apparent from the following detailed description considered in connection with the accompanying drawings which disclose the embodiments of the invention. It is to be understood, however, that the drawings are designed for the purpose of illustration only and not as a definition of the limits and scope of the invention.

In the drawings wherein similar reference characters denote similar elements throughout the several views.

Figure 1:
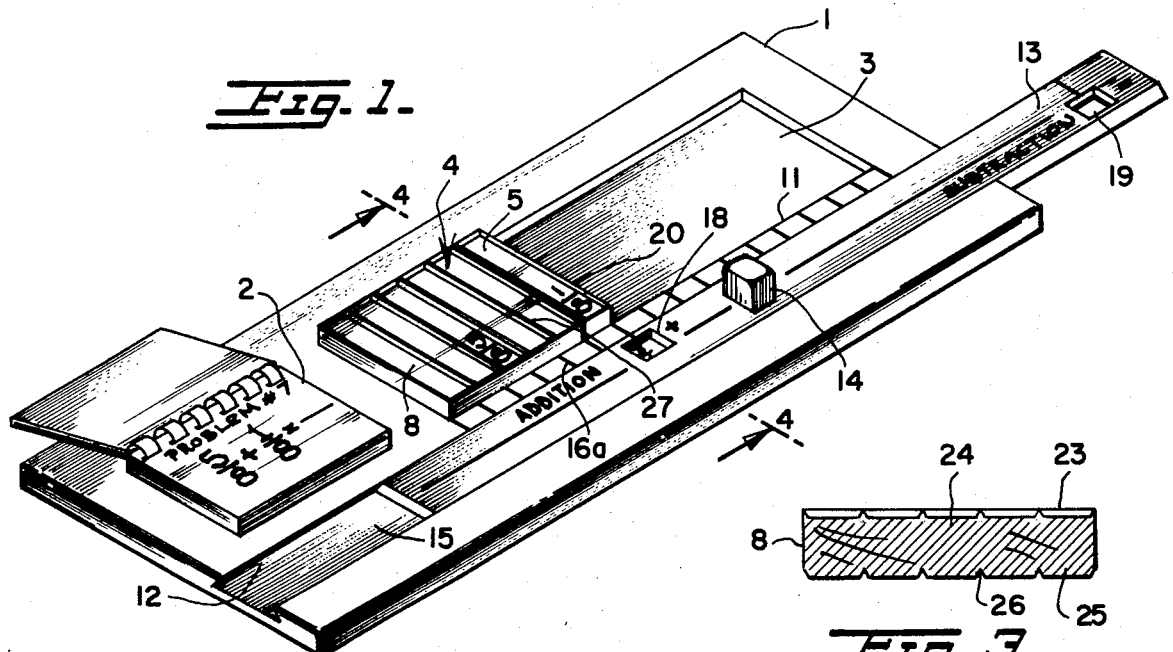
FIG. 1 is a perspective view of the device in accordance with the present invention.
Figure 5:
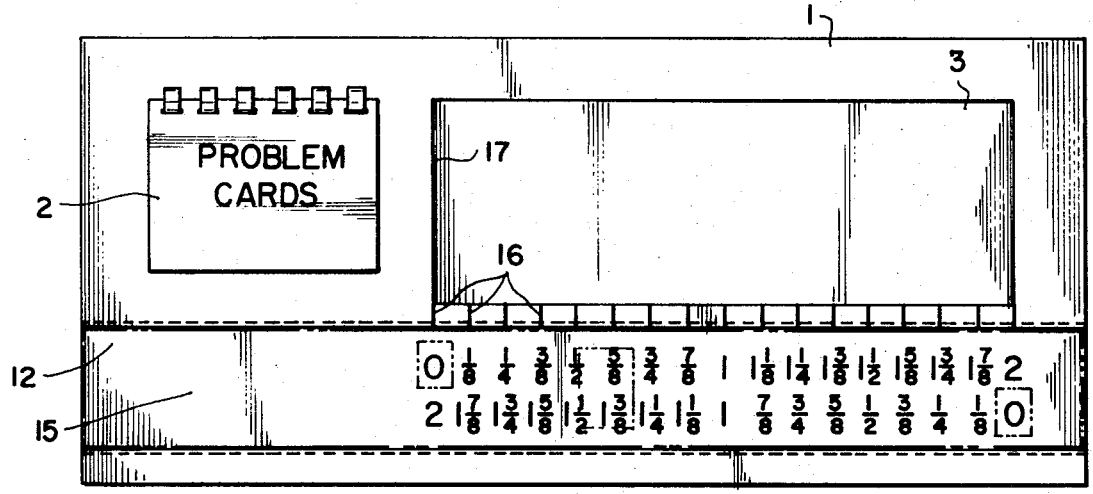
FIG. 5 is a top plan view of the device in accordance with the present invention with no bars or blocks inserted, prior to use.
Figure 6:
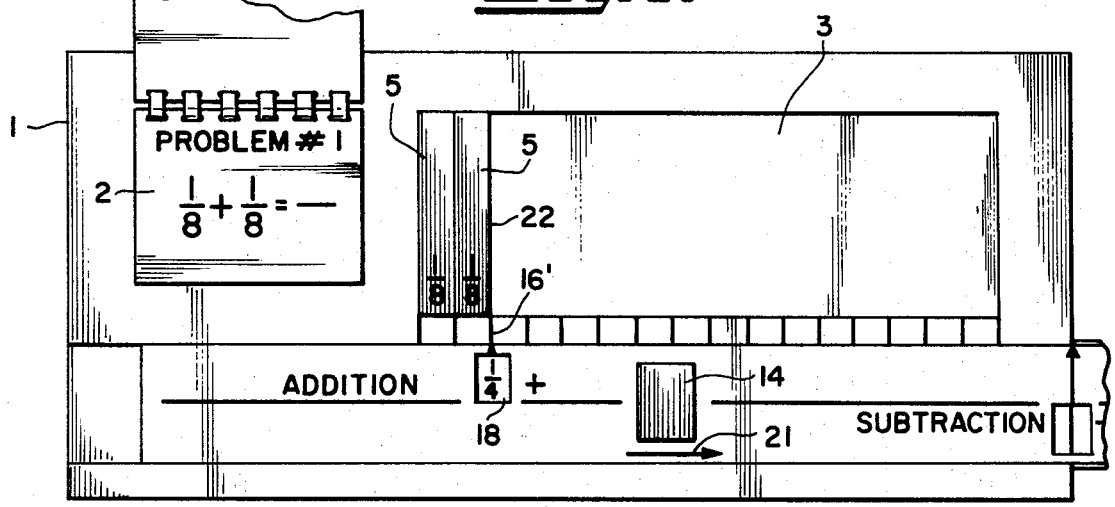
FIG. 6 is a top plan view of the device in accordance with the present invention illustrating an addition performed in accordance with the device of the present invention.
Figure 7:
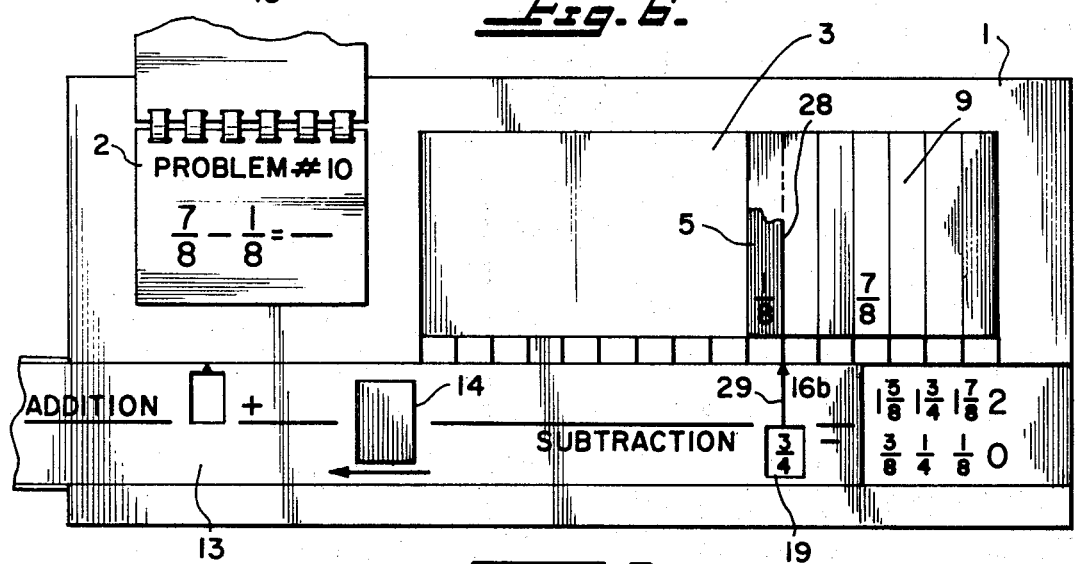
FIG. 7 is a top plan view of the device in accordance with the present invention illustrating a subtraction performed in accordance with the device of the present invention.

Referring now to the drawings, and more particularly to FIGS. 1–5, a device in accordance with the present invention comprises a board 1 having thereon a pad 2, the latter constituting a set of individual problem cards, each problem card illustrating the fractions which are to be added or subtracted, yet not providing the answer (note, for example, different problem cards in FIGS. 1, 6 and 7). The board 1 is also formed with an enlarged insert recess 3 in which a plurality of individual fraction bars or blocks 4 are adapted to be inserted in accordance with the problem to be solved. The bars or blocks 4 are formed, although not limited thereto, with different fractional representative widths, and comprise ⅛ bars 5, ¼ blocks 6, ⅜ blocks 7, ⅝ blocks 8, ⅞ blocks 9 and a unit (1) block 10. The ¼ blocks 6 have a width of twice the width of each ⅛ bars 5, and the ⅜ blocks 7 has a width equal to the width of three ⅛ bars 5. Likewise, the width of the ⅝ blocks 8 is equal to the width of five ⅛ bars 5; the width of the block 9 is equal to the width of seven of the bars 5; and the width of the blocks 10 is equal to the width of eight of the bars 5. The length of all the bars are the same and is equal to the length of the recess 3, that is, the distance between the elongated longitudinal sides 11 of the recess. The thickness of all of the bars are the same, so that when various bars are inserted into the recess 3, as will hereinafter be explained, the upper surface 4a of the bars are all even, and disposed above the surface 1a of the board 1, providing a fine appearance.

Beneath the lowermost or bottom longitudinal side 11, a dove-tail cross-sectional guide slot 12 is formed in the board, which guides slot extends parallel to the longitudinal sides 11. A slide rule 13, having a trapezoidal cross-sectional shape complementary to the dove-tail guide slot 12, is slidably mounted in the guide slot 12, and has a handle block 14 mounted centrally thereon for displacing the slide 13.

As shown in FIG. 5, the bottom 15 of the guide slot contains a fractional program card thereon, adjacent the extent of the longitudinal slides 11 of the insert 3. Between the longitudinal sides 11 of the insert 3 and the guide slot 12, the board 1 is divided with equally spaced scale indicator lines or marks 16, the distance between adjacent marks 16 being equal to the width of a ⅛ bar 5. In the examplified embodiment illustrated in FIG. 5, the longitudinal sides 11, i.e., the entire longitudinal length of the recess 3, is divided into sixteen spaced divisions between scale marks 16, each of a width of ⅛, or in total a length of two "units".

Accordingly, and corresponding thereto, the program card includes an upper line starting at the left with the indication 0, which is adjacent the first scale mark 16 at the beginning or left hand edge 17 of the recess 3. Adjacent the next scale mark 16 immediately to the right, the fraction ⅛ is marked adjacent thereto in the slot 12, indicating that the second mark 16 is spaced ⅛ of a unit away from the beginning edge 17 of the slot 3. That is, if a bar 5 is placed at the left hand side of the slot 3, it would fill the slot 3 up to the ⅛ mark, indicating ⅛ of a one unit is in the recess 3. The next scale mark 16 immediately to the right of the ⅛ mark is designated with the fraction ¼, that is, two distances of ⅛ from the edge 17. Likewise, the next mark 16 is designated with the indication ⅜, and still the next mark 16 is designated with the indication ½, that is, four 8's. Still further, the next mark 16 is designated with the fraction ⅝, and yet the next, with the fraction indication ¾, that is six ⅛ distances from the sides 17. Still the next scale mark 16 is provided with the indication ⅞, and the next thereafter with the indication 1, that is, eight ⅛ distances from the beginning side 17, or one unit. The indication marks continue for another unit with the indication marks up to 2.

A lower scale of fractions are provided on the program card on the slot 12, the same as the upper fractional indications, however, in reverse order, that is, they start with the number 2 (at the left hand edge 17) and proceed to the right in the order of subtractions of ⅛. The very last mark on the lower indication scale is 0.

The slide rule 13 is further formed with a window 18 at an upper portion thereof corresponding to the position of the upper fractional indications on the program card through which the program fractions are visible, the size of the window 18 being such that only one fraction at a time is visible therethrough. The word ADDITION is positioned on the slide scale 13 adjacent the window 18. The window 18 is disposed to the left of the slide handle 14. At the lower portion of the slide rule 13, at the extreme right hand portion thereof, there is formed a subtraction window 19, which is adjacent the lower fractional indications on the program card and is of a size to permit one fractional indication to be seen therethrough at any one time.

In operation, as the bars and blocks are placed in the insert opening 3 of the board, the slide rule 13 is displaced until the center of the corresponding window is adjacent the mark 16 of the corresponding last positioned block, as will be described in further detail below. The answer to the problem is then the fraction which appears in the window.

For example, in order to solve the problem No. 7 as indicated in FIG. 1, first a ⅝ block 8 is positioned at the left hand portion of the recess 3. Then in order to add the next fraction, namely, ⅛, a ⅛ bar 5 is positioned in the insert 3 directly abutting the right hand free edge of the block 8. Next, the slide scale 13 is displaced until the center of the window 18 as indicated by the pointer at the center of the window 18 is adjacent the right hand free edge 20 of the last bar 5 which was inserted. The answer to the problem ¾ appears in the window 18.

Referring now particularly to FIG. 6, in order to perform the addition of ⅛ plus ⅛, first a ⅛ bar 5 is inserted at the extreme left hand portion of the recess 13 against the side 17, and thereafter, a second ⅛ bar 5 is inserted abutting against the right hand free edge of the first placed ⅛ bar 5. The slide rule 13 is then displaced to the right as indicated by the arrow 21 until the window 18 is centrally located with respect to the indicator mark 16' along the free right hand edge 22 of the bar 5. The answer to the problem, namely ¼ is then visible in the window 18.

Figure 2:
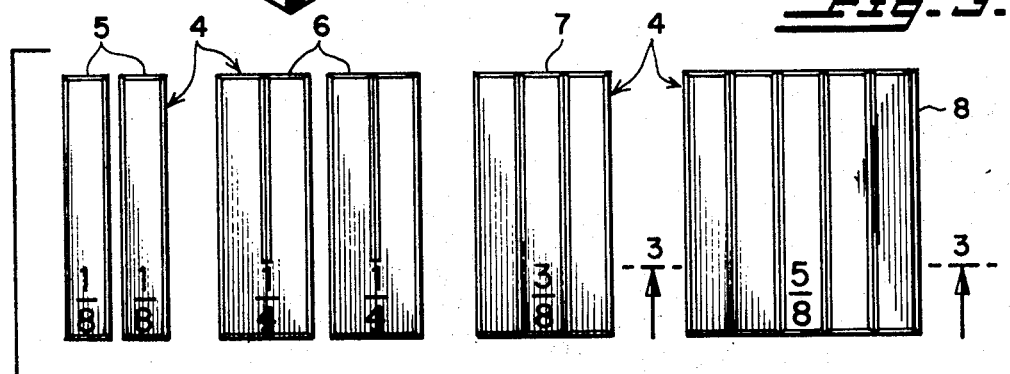
FIG. 2 is a top plan view of several bars and blocks.
Figure 3:
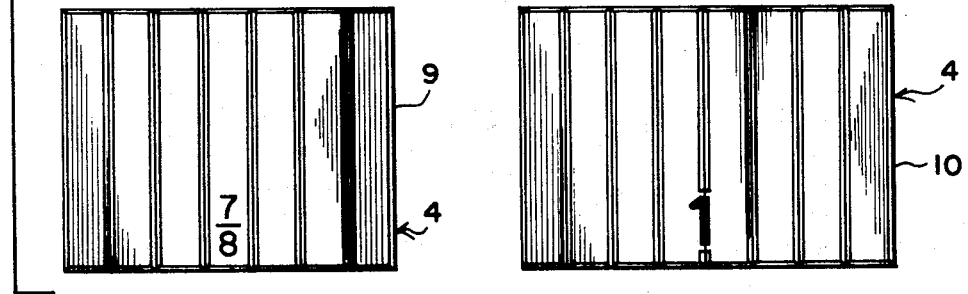
FIG. 3 is a section taken along the lines 3—3 of FIG. 2.
Figure 4:
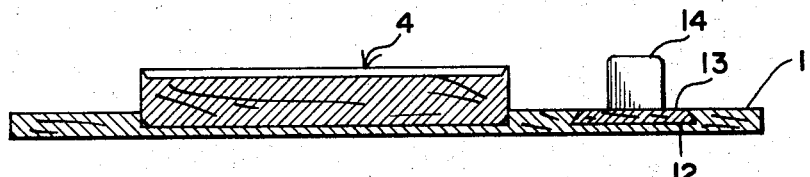
FIG. 4 is a section taken along the lines 4—4 of FIG. 1.

As indicated, in FIG. 3, the upper surface 23 of the blocks are formed with depressed recess portions 24, and the bars and blocks 4 are formed on their bottom surface 25 tooled out with notches 26, which are complementary to the depressed portions 24 on the top of the blocks, so that one bar or block may be securely held on top of another in stable position. The notches 26 and the depressed recess portions 24 are spaced in ⅛ distances, so that even the smallest ⅛ bars 5 can be accommodated in the depressed recessed portions 24. Further, the notches and depressed portions of widths of ⅛, exhibit to the student an immediate visualization of all blocks in their ⅛ fractional components; the blocks are designated with the fractional numbers as names of the blocks as indicated in FIG. 2 thereon, and the student will readily note that the ⅝ marked block 8 is formed with five portions, each of a width of ⅛. Similarly, the student recognizes that the ¼ marked block 6 is made of two ⅛ widths. A unit block, namely, the block indicated with the 1 thereon, is made of eight scored and depressed portions each equal to the ⅛ width. Further, for ready visualization and appreciation by the student, the blocks may be formed with different colors, for example, the ⅛ bars 5 may be formed yellow, the ¼ blocks 6 red, the ⅜ blocks 7 blue, and ⅝ blocks green, the ⅞ blocks 9 brown and the unit blocks 10 white.

Subtraction may be formed in accordance with the present invention in two ways. First, in an "addition" type manner by using the addition window 18, and operatively "removing" a block by placing another bar or block on top of blocks to be "removed". Any block which is so covered by another block, is considered to be removed, and the window 18 is then moved to the left by sliding the slide rule 13 to the left via the handle 14 by a distance equal to the so removed blocks. The answer is then read in the window 18.

For example, in order to perform a subtraction of ¾ minus ¼, first the slide rule is moved until the window 18 shows the fraction ¾ therein, for example, as shown in FIG. 1. Blocks are then inserted in the recess at the left thereof to correspond to this designation as indicated in FIG. 1. Then to perform the subtraction therefrom of ¼, a ¼ block 6 is then positioned over the right hand most bar 5 and the right hand most ⅛ scored portion of the block 8. This indicates that the portions to the right of score mark 27 is considered removed by the subtraction. The slide rule 13 is then displaced to the left until the window 18 is centrally located with respect to the scale mark 16a which scale mark is aligned along the score mark 27. The answer appears then in the window 18 and is the fraction ½.

The other manner of subtraction is illustrated in FIG. 7, wherein here the right-hand portion of the recess 3 is used and the lower fractional number scale and the subtraction window 19. For example, to carry out the subtraction of ⅞ minus ⅛, first a ⅞ block 9 is positioned in the right hand most portion of the recess insert 3 in the board 1. Then a ⅛ bar 5 is placed over the left hand most portion of the block 9, and that portion is considered removed, i.e., up to the score mark 28. The slide scale 13 is then displaced to the right until the center of the subtraction opening 19, indicated by the arrow 29, points aligned with the scale mark 16b which is aligned with the score mark 28. The answer is read in the window 19, in this case, the fraction ¾.

While only a single embodiment of the present invention has been shown and described, it will be obvious that many changes and modifications may be made thereunto without departing from the spirit and scope of the invention.

What is claimed is:

1. A device for teaching addition and subtraction, respectively, comprising:
    a board having a longitudinal insert recess;
    a plurality of bars having the same width and a plurality of blocks, said blocks having a width exactly equal to integral numbers times the width of said bars;
    said bars and blocks being insertable in said insert recess and are complementary at least in part thereto in a manner such that the widths of said bars and blocks are aligned in the longitudinal direction of said insert recess;
    a slide rule displaceably mounted on said board longitudinally with respect to said insert recess;
    said board having at least one numerical fractional scale of fractional numbers corresponding to a division of said insert recess in said longitudinal direction of said insert recess in units of the width of said bars; and
    said slide rule being formed with indicator means cooperating with one of said fractional numbers for indicating the answer to the solution of an addition problem and subtraction problem, respectively, corresponding to the blocks and bars positioned in said insert recess.

2. The device, as claimed in claim 1, further comprising
    a problem card set disposed on said board and containing a plurality of problems to be solved.

3. The device, as claimed in claim 1, wherein
    said board is formed with a guide slot longitudinally aligned relative to said recess,
    said slide rule is complementarily slidably disposed in said slot; and
    said slide rule is formed with at least one window constituting said indicator means, and said fractional numbers are disposed in said guide slot and said at least one window is aligned with said fractional numbers and is of a size to exhibit therethrough only one of said numbers at a time.

4. The device as claimed in claim 3, wherein
    said guide slot is dove-tail in cross-section; and
    said slide rule is trapezoidal in cross-section.

5. The device as claimed in claim 4 further comprising
    a handle on said slide rule for sliding the latter.

6. The device as claimed in claim 1, wherein
    said board includes a plurality of parallel scale marks extending longitudinally along said insert recess and uniformly dividing said recess in widths equal to that of said bars; and
    said scale marks aligned with corresponding fractional numbers of said numerical fractional scale.

7. The device as claimed in claim 1, wherein
    said blocks are scored in fractional widths equal to that of said bars.

8. The device as claimed in claim 7, wherein
    said blocks and bars are formed with depressed portions on an upper surface thereof, and
    said blocks and bars are scored on a lower surface thereof complementarily engaging in said depressed portions of said blocks and bars.

9. The device as claimed in claim 1, wherein
    said blocks and bars are coded and marked, respectively, to indicate their respective fractional widths.

10. The device as claimed in claim 1, wherein
    said bars, insert recess, and blocks are rectangular parallelepipeds.

* * * * *